United States Patent
Lee et al.

(10) Patent No.: US 8,968,898 B2
(45) Date of Patent: Mar. 3, 2015

(54) CAP ASSEMBLY OF NOVEL STRUCTURE AND CYLINDRICAL BATTERY EMPLOYED WITH THE SAME

(71) Applicant: LG Chem, Ltd., Seoul (KR)

(72) Inventors: Dong Sub Lee, Icheon-si (KR); Dong-Myung Kim, Daejeon (KR); Jae Dong Chang, Cheongju-si (KR); Jun Ho Moon, Cheongwon-gun (KR); Sang Sok Jung, Cheongwon-gun (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/851,127

(22) Filed: Mar. 27, 2013

(65) Prior Publication Data

US 2013/0216871 A1     Aug. 22, 2013

Related U.S. Application Data

(63) Continuation of application No. PCT/KR2011/007525, filed on Oct. 11, 2011.

(30) Foreign Application Priority Data

Oct. 15, 2010   (KR) ..................... 10-2010-0100737

(51) Int. Cl.
    *H01M 2/12*      (2006.01)
    *H01M 2/34*      (2006.01)
    *H01M 2/04*      (2006.01)
    *H01M 2/22*      (2006.01)

(52) U.S. Cl.
    CPC ............ *H01M 2/348* (2013.01); *H01M 2/0413* (2013.01); *H01M 2/1241* (2013.01); *H01M 2/12* (2013.01); *H01M 2/22* (2013.01); *H01M 2200/103* (2013.01)
    USPC ............................... 429/82; 429/62; 429/163

(58) Field of Classification Search
    USPC ............................... 429/62, 82, 163, 171–172
    See application file for complete search history.

(56) References Cited

U.S. PATENT DOCUMENTS

| | | | |
|---|---|---|---|
| 5,821,008 A | | 10/1998 | Harada et al. |
| 6,040,754 A | * | 3/2000 | Kawanishi .................... 337/297 |
| 2007/0212595 A1 | * | 9/2007 | Kim et al. ...................... 429/53 |
| 2009/0291330 A1 | * | 11/2009 | Onnerud et al. ................. 429/7 |

FOREIGN PATENT DOCUMENTS

| | | |
|---|---|---|
| CN | 101490874 A | 7/2009 |
| JP | 1984-195670 U | 12/1984 |

(Continued)

OTHER PUBLICATIONS

International Search Report issued PCT/KR2011/007525, mailed on Apr. 27, 2012.

*Primary Examiner* — Jonathan G Leong
*Assistant Examiner* — James Erwin
(74) *Attorney, Agent, or Firm* — Birch, Stewart, Kolasch & Birch, LLP

(57) ABSTRACT

Disclosed herein is a cap assembly disposed at an open upper end of a cylindrical container of a battery in which an electrode assembly (jelly roll) of a cathode/separator/anode structure is mounted in the cylindrical container, wherein an electrode lead of the jelly roll is electrically connected to the lower end of a safety vent having notches, which are ruptured to discharge high pressure gas when high pressure is generated in the battery, and a safety element to interrupt current at a predetermined temperature is provided between the safety vent and the electrode lead.

10 Claims, 4 Drawing Sheets

(56) References Cited

FOREIGN PATENT DOCUMENTS

| | | |
|---|---|---|
| JP | 02-112151 A | 4/1990 |
| JP | 9-199106 A | 7/1997 |
| KR | 2000-0014670 A | 3/2000 |
| KR | 10-2006-0020211 A | 3/2006 |
| KR | 10-0619631 B1 | 9/2006 |
| KR | 10-2007-0047600 A | 5/2007 |
| KR | 10-2008-0036248 A | 4/2008 |
| TW | 200805743 A | 1/2008 |

\* cited by examiner

CAP ASSEMBLY OF NOVEL STRUCTURE AND CYLINDRICAL BATTERY EMPLOYED WITH THE SAME

CROSS REFERENCE TO RELATED APPLICATIONS

This application is a Continuation of PCT International Application No. PCT/KR2011/007525 filed on Oct. 11, 2011, which claims priority under 35 U.S.C. §119(a) to Patent Application No. 10-2010-0100737 filed in the Republic of Korea on Oct. 15, 2010, all of which are hereby expressly incorporated by reference into the present application.

TECHNICAL FIELD

The present invention relates to a cap assembly of a novel structure, and, more particularly, to a cap assembly disposed at an open upper end of a cylindrical container of a battery in which an electrode assembly (jelly roll) of a cathode/separator/anode structure is mounted in the cylindrical container, wherein an electrode lead of the jelly roll is electrically connected to the lower end of a safety vent having notches, which are ruptured to discharge high pressure gas when high pressure is generated in the battery, and a safety element to interrupt current at a predetermined temperature is provided between the safety vent and the electrode lead.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, into which much research has been carried out and which is now commercially and widely used.

Depending upon the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet. The cylindrical battery has advantages in that the cylindrical battery has relatively large capacity and is structurally stable.

Also, the electrode assembly mounted in the battery case serves as a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound while a separator is disposed between the cathode and the anode or a stacked type electrode assembly configured to have a structure in which pluralities of cathodes and anodes having a predetermined size are sequentially stacked while separators are disposed respectively between the cathodes and the anodes. The jelly roll type electrode assembly has advantages in that the jelly roll type electrode assembly is easy to manufacture and has high energy density per unit mass.

FIG. 1 is a vertical sectional perspective view typically showing a general cylindrical battery.

Referring to FIG. 1, a cylindrical battery 100 is manufactured by inserting a jelly roll type (wound type) electrode assembly 120 into a cylindrical case 130, injecting an electrolyte into the cylindrical case 130, and coupling a top cap 140 having an electrode terminal (not shown), for example a cathode terminal, to the upper end, which is open, of the cylindrical case 130.

The jelly roll type electrode assembly 120 is configured to have a structure in which a cathode 121 and an anode 122 are wound in a circle in a state in which a separator 123 is disposed between the cathode 121 and the anode 122. A cylindrical center pin 150 is disposed at the center of the roll, i.e. the center of the electrode assembly 120. The center pin 150 is generally made of a metal material to exhibit predetermined strength. The center pin 150 is configured to have a hollow cylindrical structure formed by rolling a metal sheet. The center pin 150 serves to fix and support the electrode assembly 120. In addition, the center pin 150 serves as a passage to discharge gas generated by internal reaction of the secondary battery when charging and discharging the secondary battery or when operating the secondary battery.

Meanwhile, a lithium secondary battery has a disadvantage in that the lithium secondary battery has low safety. For example, when the battery is overcharged to approximately 4.5 V or more, a cathode active material is decomposed, dendritic growth of lithium metal occurs at an anode, and an electrolyte is decomposed. At this time, heat is generated from the battery with the result that the above-mentioned decompositions and several sub decompositions rapidly progress, and, eventually, the battery may catch fire and explode.

In order to solve the above-mentioned problems, therefore, a general cylindrical secondary battery includes a current interruptive device (CID) mounted in a space defined between a jelly roll type electrode assembly and a top cap to interrupt current and release internal pressure when the secondary battery malfunctions.

A series of operations performed by such a CID is shown in FIGS. 2 to 4.

Referring to these drawings, a top cap 10 protrudes to form a cathode terminal. The top cap 10 has exhaust ports. Below the top cap 10 are sequentially disposed a positive temperature coefficient (PTC) element 20 to interrupt current through significant increase of battery resistance when the interior temperature of the battery increases, a safety vent 30 configured to have a downwardly depressed shape in a normal state and to protrude and rupture for exhausting gas when the interior pressure of the battery increases, and a current interruptive device 50 coupled to the safety vent 30 at one side of the upper end thereof and connected to a cathode of an electrode assembly 40 at one side of the lower end thereof. Also, the outer circumference of the current interruptive device 50 is surrounded by a current interruptive device gasket 52 to fix the current interruptive device 50.

Under normal operating conditions, therefore, the cathode of the electrode assembly 40 is connected to the top cap 10 via an electrode lead 42, the current interruptive device 50, the safety vent 30, and the PTC element 20 to achieve electric conduction.

However, when gas is generated from the electrode assembly 40 for various reasons, such as overcharging, the internal pressure of the battery increases, and the shape of the safety vent 30 is inversed as shown in FIG. 3. That is, the safety vent 30 protrudes upward. At this time, the safety vent 30 is separated from the current interruptive device 50 to interrupt current. As a result, the overcharging is prevented from further progressing, thereby achieving safety. When the internal pressure of the battery continues to increase, however, the safety vent 30 ruptures, as shown in FIG. 4, with the result that the pressurized gas is discharged through the exhaust ports of the top cap 10 via the ruptured safety vent 30, thereby preventing explosion of the battery.

Meanwhile, the cylindrical secondary battery must exhibit a high temperature storage property in addition to the above-described overcharging property.

The high temperature storage property entails a unique property of a battery in which voltage of the battery does not fall when a battery is maintained at a predetermined temperature (for example, 75° C.) for a long period of time. Specifically, the high temperature storage property entails operation of the battery at normal voltage and current even after testing.

The overcharging property entails normal operation of a CID to effectively interrupt voltage and current, thereby preventing explosion of a battery before the battery is exploded due to increase in internal pressure and temperature of the battery when the battery is charged to a higher level than normal voltage.

A method of adjusting an amount of an electrolyte injected within a short circuit pressure range of 8 to 14 kgf/cm$^2$ is mainly used to satisfy both the high temperature storage property and the overcharging property.

If a small amount of the electrolyte is injected into the cylindrical battery container, the high temperature storage property becomes advantageous but the overcharging property becomes disadvantageous. That is, if the amount of the electrolyte is small, the internal space of the battery cell is increased. If gas is generated in the battery cell in a state in which the battery cell is overcharged, therefore, the internal temperature of the battery cell is increased before sufficient gas to rupture the CID is generated with the result that the battery cell is exploded.

On the other hand, if a large amount of the electrolyte is injected into the cylindrical battery container, the overcharging property becomes advantageous but the high temperature storage property becomes disadvantageous. That is, if the amount of the electrolyte is large, the internal space of the battery cell is decreased. If gas is generated in the battery cell in a state in which the battery cell is at a high temperature, therefore, the CID is ruptured with the result that the battery cell cannot be used.

Consequently, there is a high necessity for a cap assembly of a novel structure that is capable of simultaneously satisfying a high temperature storage property and an overcharging property without adjusting an amount of an electrolyte injected and a cylindrical battery including such as cap assembly.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, when a safety element to interrupt current at a predetermined temperature is coupled between a safety vent of a cap assembly and an electrode lead, it is possible to simultaneously satisfy a high temperature storage property and an overcharging property without adjusting an amount of an electrolyte injected. The present invention has been completed based on these findings.

Technical Solution

In accordance with one aspect of the present invention, the above and other objects can be accomplished by the provision of a cap assembly disposed at an open upper end of a cylindrical container of a battery in which an electrode assembly (jelly roll) of a cathode/separator/anode structure is mounted in the cylindrical container, wherein an electrode lead of the jelly roll is electrically connected to the lower end of a safety vent having notches, which are ruptured to discharge high pressure gas when high pressure is generated in the battery, and a safety element to interrupt current at a predetermined temperature is provided between the safety vent and the electrode lead.

That is, in the cap assembly according to the present invention, the safety vent of the cap assembly and the electrode lead of the jelly roll are electrically connected to each other via the safety element to interrupt current at a predetermined temperature. Consequently, it is possible to simultaneously satisfy a high temperature storage property and an overcharging property without adjusting an amount of an electrolyte injected.

Specifically, in the cap assembly according to the present invention, the safety element serves to interrupt current at a predetermined temperature, and therefore, current is not interrupted although the internal pressure of the battery cell is somewhat increased unlike a conventional cap assembly in which the internal space of the battery cell is decreased when the amount of electrolyte is large with the result that a current interruptive device (CID) is ruptured when gas is generated. Consequently, the cap assembly according to the present invention contributes to a high temperature storage property.

Also, even in a case in which the amount of electrolyte is small, current is interrupted by the safety element when the internal temperature of the battery cell is continuously increased due to overcharging, and therefore, the temperature of the battery cell reaches a predetermined temperature before explosion. Consequently, it is possible to restrain further increase of temperature, thereby effectively preventing explosion of the battery cell.

Furthermore, the cap assembly according to the present invention does not need a current interruptive device and a gasket for the current interruptive device, and therefore, it is possible to reduce manufacturing cost. Also, it is sufficient to inject an appropriate amount of electrolyte to such an extent that the battery cell is normally operated, and therefore, it is possible to improve injection efficiency.

In addition, the safety element is located between the safety vent and the electrode lead so that the safety element is disposed adjacent to the jelly roll. Consequently, the safety element can more rapidly react to the change in temperature of the jelly roll to interrupt current at a predetermined temperature.

Preferably, an insulative plate to prevent contact between the jelly roll and the safety element is mounted at the top of the jelly roll to prevent the occurrence of a short circuit due to contact between the safety element and the jelly roll.

In a preferred example, the safety element may include a thermal fuse.

The thermal fuse interrupts current when the battery is thermally shocked, overcharged or dropped, thereby improving safety of the battery. Also, the thermal fuse easily solves process-based problems, such as increase and decrease of short circuit pressure.

The predetermined temperature may be 80° C. to 110° C., preferably 80° C. to 100° C. If the temperature is too low, current may be interrupted under a high temperature storage condition. On the other hand, if the temperature is too high, current may not be interrupted under an overcharging condition.

The electrode lead may be bent outward from the front end of a region of the electrode lead to which the safety element is coupled so that the electrode lead is directed outward from the center of the jelly roll, and is then bent inward from the rear end of the region of the electrode lead to which the safety element is coupled. Consequently, the safety element is prevented from being bent and damaged.

In the above structure, the safety element may be coupled to a portion of the upper end of the electrode lead. For example, the safety element may be integrally coupled to a portion of the upper end of the electrode lead by welding.

The safety vent is a kind of safety device that discharges gas from the battery, when the internal pressure of the battery is increased due to abnormal operation of the battery or deterioration of components constituting the battery, thereby securing safety of the battery. For example, when gas is generated in the battery, and the internal pressure of the battery exceeds a critical value, the safety vent is ruptured, and therefore, gas passes through the ruptured safety vent and is then discharged from the battery through one or more gas discharge ports formed at a top cap.

The material for the safety vent is not particularly restricted. Preferably, the safety vent is formed of an aluminum sheet having a thickness of 0.15 to 0.4 mm so that the safety vent is ruptured when the internal pressure of the battery exceeds a critical value.

In a preferred example, the safety vent may be provided at the center thereof with a depression configured to be depressed downward, first and second notches may be formed at upper and lower bent regions defining the depression, respectively, the first notch may form a closed curve, the second notch formed below the first notch may be configured in the shape of an open curve, one side of which is open, and the second notch may be more deeply formed than the first notch.

Since the second notch is more deeply formed than the first notch, the second notch is cut off when pressurized gas, the pressure of which exceeds a critical pressure, is applied to the safety vent. On the other hand, when pressurized gas, the pressure of which is less than the critical pressure, is applied to the safety vent, the first notch cooperates with the second notch to raise the depression upward.

In a preferred example, the cap assembly may be configured to have a structure in which a top cap, at which at least one gas discharge port is formed, and the safety vent are stacked, and a gasket may be mounted at the outer circumference of the cap assembly.

Consequently, the top of the electrode lead, to which the safety element is coupled, is coupled to the safety vent by welding, and therefore, it is possible to manufacture the cap assembly through successive processes.

Also, the cap assembly configured to have the above structure does not need a positive temperature coefficient (PTC) element, a current interruptive device (CID) and a current interruptive device gasket as compared with the conventional cap assembly including the top cap, the safety vent, the PTC element, the CID and the current interruptive device gasket as shown in FIG. 2.

Since the cap assembly according to the present invention does not need the current interruptive device (CID) and the current interruptive device gasket as described above, it is possible to reduce manufacturing costs of the cap assembly. Also, since the cap assembly according to the present invention does not need the PTC element, it is possible to reduce the height of the crimping part in direct proportion to the height of the PTC element with the result that the height of the beaded part is increased, thereby increasing battery capacity of the jelly roll.

In accordance with another aspect of the present invention, there is provided a cylindrical battery including the cap assembly.

The cylindrical secondary battery according to the present invention is manufactured by coupling the cap assembly to the upper end, which is open, of a cylindrical metal container in a state in which a jelly roll type electrode assembly is mounted in the cylindrical metal container, welding an anode of the electrode assembly to the lower end of the container, and welding a cathode of the electrode assembly to the cap assembly coupled to the upper end of the container to hermetically seal the battery in a state in which the electrode assembly and an electrolyte are contained in the container.

The battery according to the present invention may be a lithium secondary battery having high energy density, high discharge voltage, and high output stability. Other components of the lithium secondary battery according to the present invention will be hereinafter described in detail.

Generally, the lithium secondary battery includes a cathode, an anode, a separator, and a nonaqueous electrolyte containing lithium salt.

The cathode may be manufactured, for example, by applying a mixture of a cathode active material, a conductive material, and a binder to a cathode current collector and drying the applied mixture. A filler may be further added as needed. The anode may be manufactured by applying an anode material to an anode current collector and drying the applied anode material. The above-mentioned ingredients may be further added as needed.

The separator is disposed between the anode and the cathode. The separator may be formed of an insulative thin film exhibiting high ion permeability and high mechanical strength.

The nonaqueous electrolyte containing lithium salt consists of a nonaqueous electrolyte and lithium salt. A liquid nonaqueous electrolyte, a solid nonaqueous electrolyte, or an inorganic solid nonaqueous electrolyte may be used as the nonaqueous electrolyte.

The current collector, the electrode active material, the conductive material, the binder, the filler, the separator, the electrolyte, and the lithium salt are well known in the art to which the present invention pertains, and therefore, a detailed description thereof will be omitted.

The lithium secondary battery according to the present invention may be manufactured using an ordinary method well known in the art to which the present invention pertains. That is, the lithium secondary battery may be manufactured by disposing a porous separator between a cathode and an anode and injecting an electrolyte thereinto.

The cathode may be manufactured, for example, by applying a slurry consisting of a lithium transition metal oxide active material, a conductive material and a binder, which were previously described, to a current collector and drying the slurry. In the same manner, the anode may be manufactured, for example, by applying a slurry consisting of a carbon active material, a conductive material and a binder, which were previously described, to a thin current collector and drying the slurry.

Advantageous Effects

As is apparent from the above description, in the cap assembly according to the present invention, the safety element to interrupt current at a predetermined temperature is connected between the safety vent and the electrode lead. Consequently, it is possible to simultaneously satisfy a high temperature storage property and an overcharging property without adjusting an amount of an electrolyte injected.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, a preferred embodiment of the present invention will be described in detail with reference to the accompanying drawings. It should be noted, however, that the scope of the present invention is not limited by the illustrated embodiment.

Figure 5:
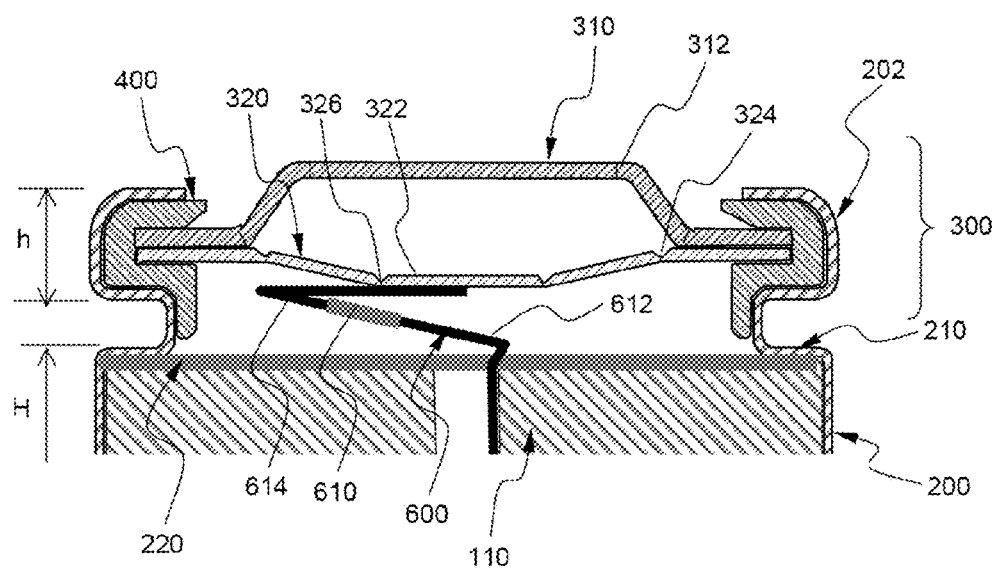
FIG. 5 is a partial sectional view typically illustrating a cylindrical battery according to an embodiment of the present invention.
Figure 6:
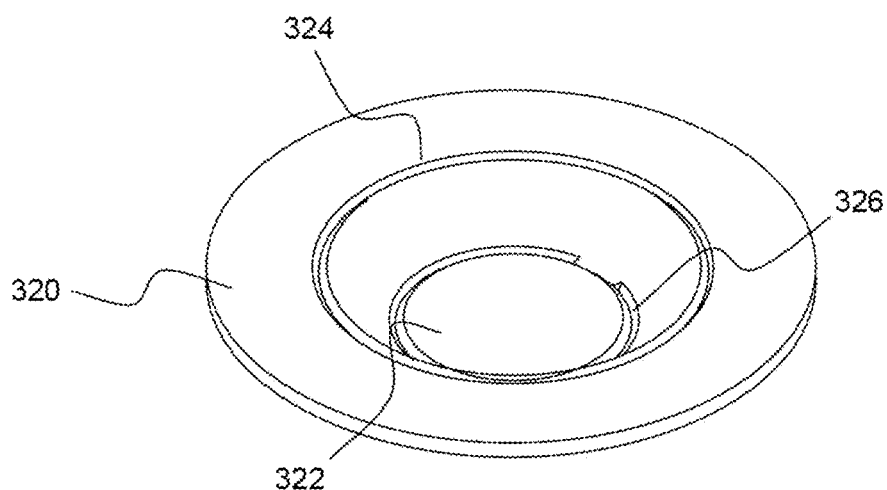
FIG. 6 is a perspective view showing a safety vent used in the cylindrical battery of FIG. 5.

FIG. 5 is a partial sectional view typically illustrating a cylindrical battery according to an embodiment of the present invention, and FIG. 6 is a perspective view typically showing a safety vent used in the cylindrical battery of FIG. 5.

Referring to these drawings, a cylindrical battery 100a according to an embodiment of the present invention is manufactured by inserting a jelly roll 110 into a container 200, injecting an electrolyte into the container 200, and mounting a cap assembly 300 to the upper end, which is open, of the container 200.

The cap assembly 300 is configured to have a structure in which a top cap 310 and a safety vent 320 to reduce the internal pressure of the battery are disposed in an airtight gasket 400 mounted at the inside of a crimped part 202 of the container and at the inside of the upper part of a beaded part 210 of the container 200 while being in tight contact with each other. The center of the top cap 310 protrudes upward to serve as a cathode terminal for connection with an external circuit. A plurality of through holes 312 is formed around the protrusion of the top cap 310 so that compressed gas is discharged from the container 200 through the through holes 312.

Also, the cap assembly 300 is configured to have a structure in which the top cap 310, at which the through holes 312 serving as gas discharge ports are formed, and the safety vent 320 are stacked. The gasket 400 is mounted at the outer circumference of the cap assembly 300.

Figure 1:
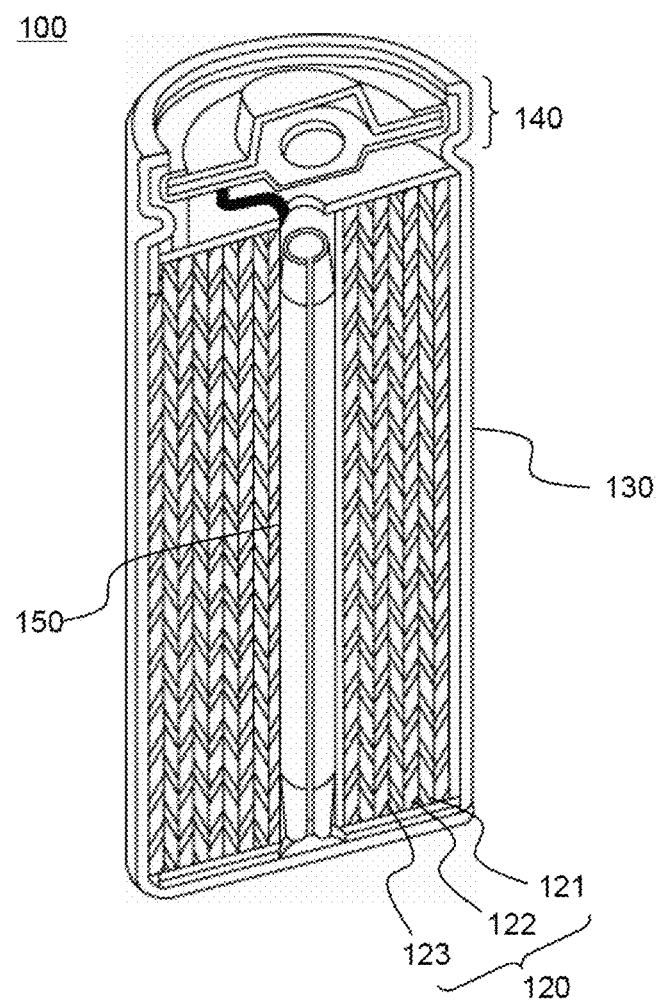
FIG. 1 is a vertical sectional perspective view showing a general cylindrical battery.
Figure 2:
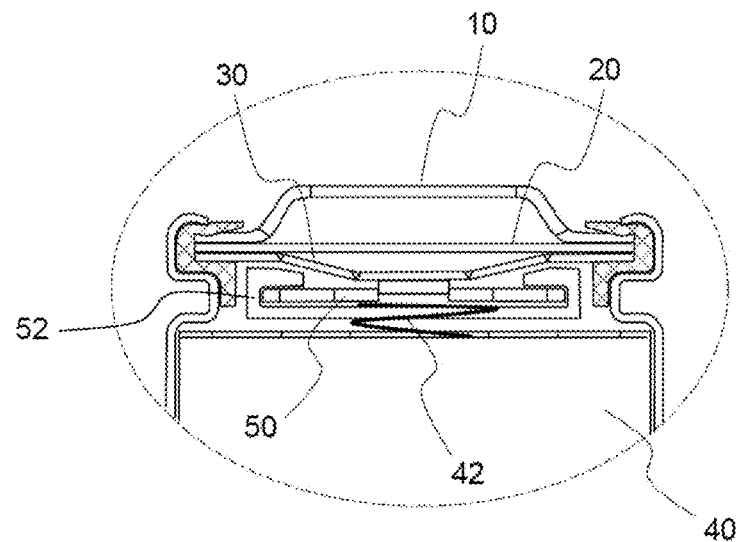
FIGS. 2 to 4 are vertical sectional views showing a series of processes of interrupting current and discharging high-pressure gas from the cylindrical battery through the operation of a current interruptive device (CID)
Figure 3:
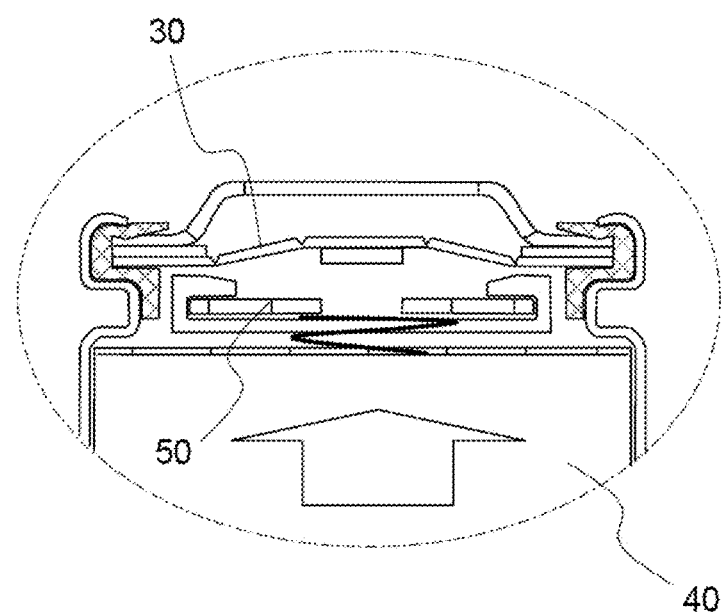
Figure 4:
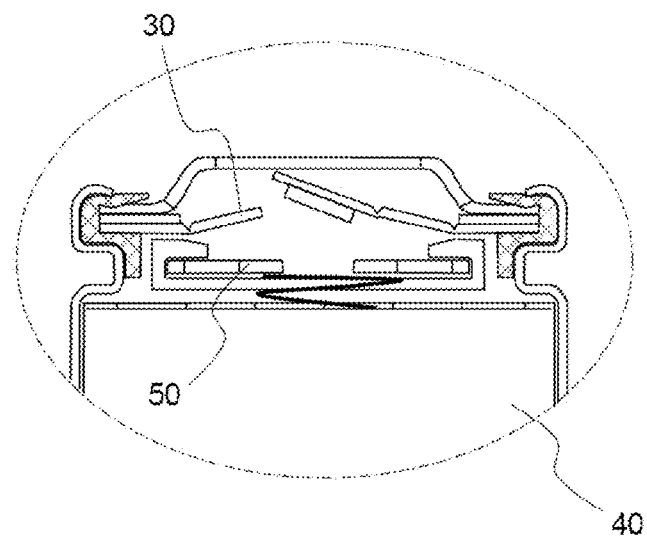

As a result, the cap assembly 300 of FIG. 5 does not require a positive temperature coefficient (PTC) element 200 as compared with the cap assembly of FIG. 2. Consequently, the height of the crimping part 202 is reduced in direct proportion to the height of the PTC element 200 with the result that the height H of the beaded part 210 is increased, thereby increasing battery capacity of the jelly roll 110.

The safety vent 320 is a thin-film structure transmitting current. The center of the safety vent 320 is depressed to form a depressed center part 322. Two notches 324 and 326 having different depths are formed at upper and lower bent regions of the center part 322, respectively.

Also, an electrode lead 600 of the jelly roll 110 is connected to the lower end of the safety vent 320. A safety element 610 to interrupt current at a temperature of 80° C. to 110° C. is coupled to the electrode lead 600.

Since the safety element 610 is disposed adjacent to the jelly roll 100, the safety element 610 can more rapidly react to the change in temperature of the jelly roll 100 to interrupt current.

An insulative plate 220 to prevent contact between the jelly roll 110 and the safety element 610 is mounted at the top of the jelly roll 110, thereby preventing the occurrence of a short circuit due to contact between the jelly roll 110 and the safety element 610.

Also, the electrode lead 600 is bent outward from the front end of a region of the electrode lead 600 to which the safety element 610 is coupled so that the electrode lead 600 is directed outward from the center of the jelly roll, and is then bent inward from the rear end of the region of the electrode lead 600 to which the safety element 610 is coupled.

Meanwhile, the first notch 324 formed at the upper part of the safety vent 320 forms a closed curve, and the second notch 326 formed at the lower part of the safety vent 320 is configured in the shape of an open curve, one side of which is open. Also, the second notch 326 is more deeply formed than the first notch 324. Consequently, the coupling force of the second notch 326 is less than that of the first notch 324.

When the internal pressure of the container 200 exceeds a critical pressure, therefore, the second notch 326 of the safety vent 320 is ruptured with the result that pressurized gas is discharged from the container 200 through the through holes 312 of the top cap 310.

Figure 7:
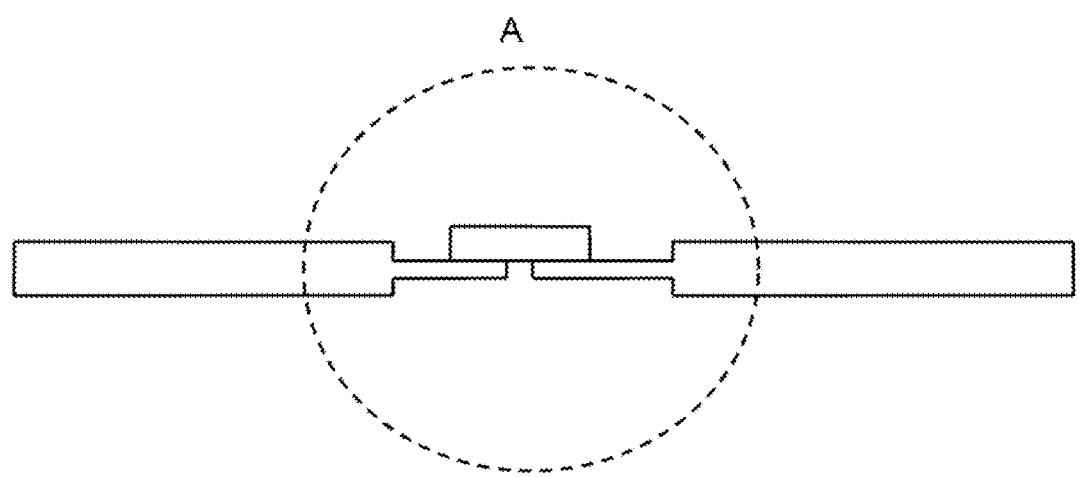
FIG. 7 is a sectional view typically showing a safety element of FIG. 5.

FIG. 7 is a sectional view typically showing the safety element of FIG. 5.

Referring to FIG. 7, a thermal fuse 610, as the safety element, is configured so that the middle region A of the thermal fuse 610 is formed in the shape of a thin sheet. Consequently, when the interior temperature of the battery is 80° C. or less, for example, current is not interrupted, thereby satisfying a high temperate storage property. On the other hand, when the interior temperature of the battery cell exceeds 80° C., the middle region A, which is relatively thin, of the thermal fuse 610 is ruptured to interrupt current flowing from the jelly roll 110 to the safety vent 320, thereby preventing explosion of the battery due to overcharging.

In addition to the above-mentioned structure, other different structures may be used to interrupt current at a predetermined temperature.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A cap assembly disposed at an open upper end of a cylindrical container of a battery in which an electrode assembly (jelly roll) of a cathode/separator/anode structure is mounted in the cylindrical container, wherein
an electrode lead of the jelly roll is electrically connected to the lower end of a safety vent having notches, which are ruptured to discharge high pressure gas when high pressure is generated in the battery, and the electrode lead is bent outward from the front end of a region of the electrode lead to which a thermal fuse to interrupt current at a predetermined temperature is coupled so that the electrode lead is directed outward from the center of the jelly roll, and is then bent inward from the rear end of the region of the electrode lead to which the thermal fuse is coupled.

2. The cap assembly according to claim 1, wherein an insulative plate to prevent contact between the jelly roll and the thermal fuse is mounted at the top of the jelly roll.

3. The cap assembly according to claim 1, wherein the predetermined temperature is 80° C. to 110° C.

4. The cap assembly according to claim 1, wherein the predetermined temperature is 90° C. to 100° C.

5. The cap assembly according to claim 1, wherein the thermal fuse is formed at a portion of the upper end of the electrode lead.

6. The cap assembly according to claim 1, wherein the safety vent is formed of an aluminum sheet having a thickness of 0.15 to 0.4 mm.

7. The cap assembly according to claim 1, wherein the safety vent is provided at the center thereof with a depression configured to be depressed downward, first and second notches are formed at upper and lower bent regions defining the depression, respectively, the first notch forms a closed curve, the second notch formed below the first notch is configured in the shape of an open curve, one side of which is open, and the second notch is more deeply formed than the first notch.

8. The cap assembly according to claim 1, wherein the cap assembly is configured to have a structure in which a top cap, at which at least one gas discharge port is formed, and the safety vent are stacked, and a gasket is mounted at the outer circumference of the cap assembly.

9. A cylindrical battery comprising a cap assembly according to claim 1.

10. The cylindrical battery according to claim 9, wherein the battery comprises a lithium secondary battery.

* * * * *